(12) United States Patent
Arpa et al.

(10) Patent No.: US 7,259,778 B2
(45) Date of Patent: Aug. 21, 2007

(54) METHOD AND APPARATUS FOR PLACING SENSORS USING 3D MODELS

(75) Inventors: Aydin Arpa, Plainsboro, NJ (US); Keith J. Hanna, Princeton, NJ (US); Supun Samarasekera, Princeton, NJ (US); Rakesh Kumar, Monmouth Junction, NJ (US); Harpreet Sawhney, West Windsor, NJ (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 10/779,444

(22) Filed: Feb. 13, 2004

(65) Prior Publication Data

US 2005/0002662 A1    Jan. 6, 2005

Related U.S. Application Data

(60) Provisional application No. 60/484,138, filed on Jul. 1, 2003.

(51) Int. Cl.
*H04N 7/18*    (2006.01)

(52) U.S. Cl. .................... 348/139; 348/25; 348/159

(58) Field of Classification Search ............ 348/139, 348/39–62, 142–160, 20–70, 120–170
See application file for complete search history.

(56) References Cited

U.S. PATENT DOCUMENTS

| | | | |
|---|---|---|---|
| 5,164,979 A | | 11/1992 | Choi |
| 5,182,641 A | * | 1/1993 | Diner et al. .................. 348/86 |
| 5,276,785 A | * | 1/1994 | Mackinlay et al. ......... 345/427 |
| 5,289,275 A | | 2/1994 | Ishii et al. |
| 5,495,576 A | * | 2/1996 | Ritchey ..................... 395/125 |
| 5,729,471 A | * | 3/1998 | Jain et al. .................. 725/131 |
| 5,850,469 A | | 12/1998 | Martin et al. |
| 5,963,664 A | * | 10/1999 | Kumar et al. .............. 382/154 |
| 5,986,668 A | * | 11/1999 | Szeliski et al. ............. 345/634 |
| 601,839 A | | 1/2000 | Szeliski et al. |
| 6,144,797 A | * | 11/2000 | MacCormack et al. ........ 386/46 |
| 6,160,907 A | * | 12/2000 | Robotham et al. .......... 382/154 |
| 6,522,787 B1 | * | 2/2003 | Kumar et al. .............. 382/268 |
| 6,668,082 B1 | | 12/2003 | Davison et al. |
| 6,985,620 B2 | | 1/2006 | Sawhney et al. |

(Continued)

FOREIGN PATENT DOCUMENTS

EP    0898245    2/1999

(Continued)

OTHER PUBLICATIONS

Vedula et al., Modeling, Combining, and Rendering Dynamic Real-World Events from Image Sequences, 1998(?).

(Continued)

*Primary Examiner*—Anand Rao
(74) *Attorney, Agent, or Firm*—Tiajoloff & Kelly (57) ABSTRACT

Method and apparatus for dynamically placing sensors in a 3D model is provided. Specifically, in one embodiment, the method selects a 3D model and a sensor for placement into the 3D model. The method renders the sensor and the 3D model in accordance with sensor parameters associated with the sensor and parameters desired by a user. In addition, the method determines whether an occlusion to the sensor is present.

38 Claims, 6 Drawing Sheets

U.S. PATENT DOCUMENTS

| | | |
|---|---|---|
| 7,124,427 B1 | 10/2006 | Esbensen |
| 2001/0043738 A1 | 11/2001 | Sawhney et al. |
| 2002/0140698 A1* | 10/2002 | Robertson et al. .......... 345/427 |
| 2003/0014224 A1 | 1/2003 | Guo et al. |
| 2003/0085992 A1 | 5/2003 | Arpa et al. |
| 2005/0024206 A1 | 2/2005 | Samarasekera et al. |

FOREIGN PATENT DOCUMENTS

| | | |
|---|---|---|
| WO | WO9737494 | 10/1997 |
| WO | WO 0072573 | 11/2000 |
| WO | WO 01/67749 A2 | 9/2001 |
| WO | WO 0167749 A2 | 9/2001 |
| WO | WO 03/067537 A2 | 8/2003 |
| WO | WO 2004/114648 A2 | 12/2004 |

OTHER PUBLICATIONS

Silicon Graphics, Silicon Graphics Witches Brew UAV, UAV, Nov. 10, 1998.

Dorsey et al., Design and Simulation of Opera Lighting and Projection Effects, Jul. 1991, Computer Graphics, vol. 25, No. 4, pp. 41-50.

State et al., Technologies for Augmented Reality Systems: Realizing Ultrasound-guided Needle Biopsies, 1996(?).

Spann et al., Photogrammetry Using 3D Graphics and Projective Textures, 2000, IAPRS, vol. XXXIII, Amsterdam.

Sequeira et al., Augmented Reality in Multi-camera Surveillance, May 1999, ESCARDA Symposium on Safeguards and Nuclear Material Management, pp. 661-666, Seville, Spain.

Segal et al., Fast Shadows and Lighting Effects Using Texture Mapping, Jul. 1992, Computer Graphics, vol. 26, No. 2, pp. 249-252.

Akesson (?), Augmented Virtuality: A method to automatically augment virtual worlds with video images, Apr. 20, 1998.

Bajura et al., Merging Virtual Objects with Real World, Jul. 1992, Computer Graphics, vol. 26, No. 2, pp. 203-210.

Weinhaus et al., Texture Mapping 3D Models of Real-World Scenes, Dec. 1997, ACM Computing Surveys, vol. 29, No. 4, pp. 325-365.

Simsarian et al., Windows on the World: An example of Augmented Virtuality, 1997(?).

Kawasaki et al., Automatic Modeling of a 3D City Map from Real-World Video, Oct. 1999, ACM Multimedia '99, pp. 11-18.

Akesson et al., Reality Portals, pp. 11-18, ACM, 1999.

Debevec et al., Modeling and rendering architecture from photographs: a hybrid geometry and image-based approach, 1996(?), pp. 1-10.

"Fast Shadows and Lighting Effects Using Texture Mapping", Mark Segal et al., SIGGRAPH '92 Chicago, Jul. 26-31, 1992, pp. 249-252.

* cited by examiner

METHOD AND APPARATUS FOR PLACING SENSORS USING 3D MODELS

CROSS-REFERENCE TO RELATED APPLICATIONS

This application claims benefit of U.S. provisional patent application Ser. No. 60/484,138, filed Jul. 1, 2003, which is herein incorporated by reference.

BACKGROUND OF THE INVENTION

1. Field of the Invention

Embodiments of the present invention generally relate to surveillance systems and, more particularly, relates to a method and apparatus for dynamically configuring sensor placement using a 3D model.

2. Description of the Related Art

The current preferred method for optimizing the design of a sensor (e.g., a camera) layout is to begin with a 2D plan view of the environment, and to place cameras manually on the 2D plan view. In many cases, the design finishes at this point. In other cases, the desired field of views of the cameras are computed using a spreadsheet that computes the pixel size of an object given a camera's field of view using a 2D model of the environment. The cameras are then positioned at the computed distance apart (from one another) in an attempt to make sure that objects in the camera view are the correct size, and that all of the desired portions of the scene are covered by a camera view.

One problem with this approach is that the 2D model does not accurately capture the complex 3D projection of the scene into the 2D imager. For example, a camera looking obliquely at the scene will cover a different portion of area on the ground compared to a camera looking less obliquely. This significantly changes the area of coverage, and makes it difficult to guarantee that an area of ground will in fact be covered when the cameras are actually installed.

Another problem associated with this approach is that regions of occlusion are typically missed, resulting in unexpected blind-spots in camera coverage that are only apparent when the cameras are installed. It is often too expensive to fix the problem by adding or re-positioning cameras in a trial and error approach.

Another approach to designing a camera layout is to visit the location, and to gain access to each candidate site for a camera. A user holds up a calibrated, rectangular device and the scene is observed through the rectangle. The size of the rectangle is varied to simulate variation in the field of view of the camera. However, this approach requires the user to visit the location and repeat the process of calibrating the rectangular device for each camera location. This approach is expensive and impractical in many locations.

With each of the above-described approaches a user is unable to ascertain an accurate indication of the sensor coverage of a desired site until all of the sensors are installed and evaluated. Therefore, there is a need in the art for a method and apparatus for dynamically providing sensor and/or camera placement using a 3D model.

SUMMARY OF THE INVENTION

In one embodiment, the present invention discloses a method and apparatus for modeling placement of sensors using a 3D model. This novel system is for displaying and interactively modifying the location, orientation, field of view, and other parameters of one or more sensors, e.g., infrared sensors, ultrasonic sensors, motion sensors, and cameras, using a 3D model of the scene. This unique approach can optionally display regions of occlusion, size of objects in the field, the image captured from each camera sensor, regions that are within the range of alarms and other parameters based on the sensors that are deployed. This novel system allows a user to drag and drop sensors on the 3D model and to adjust them interactively in order to optimize the placement of sensors at a scene.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

The present invention is a method and apparatus for sensor placement which displays and interactively modifies the location, orientation, field of view, and other parameters of one or more sensors, e.g., cameras, infrared sensors, ultrasonic sensors, and motion sensors, using a 3D model of the scene. In addition, the method and apparatus interactively display regions of occlusion, size of objects in the field of view, the image captured from the camera sensor, regions that are within the range of alarms (video-based or otherwise), and other image parameters in order to optimize the design of a sensor layout at a scene.

Figure 1:
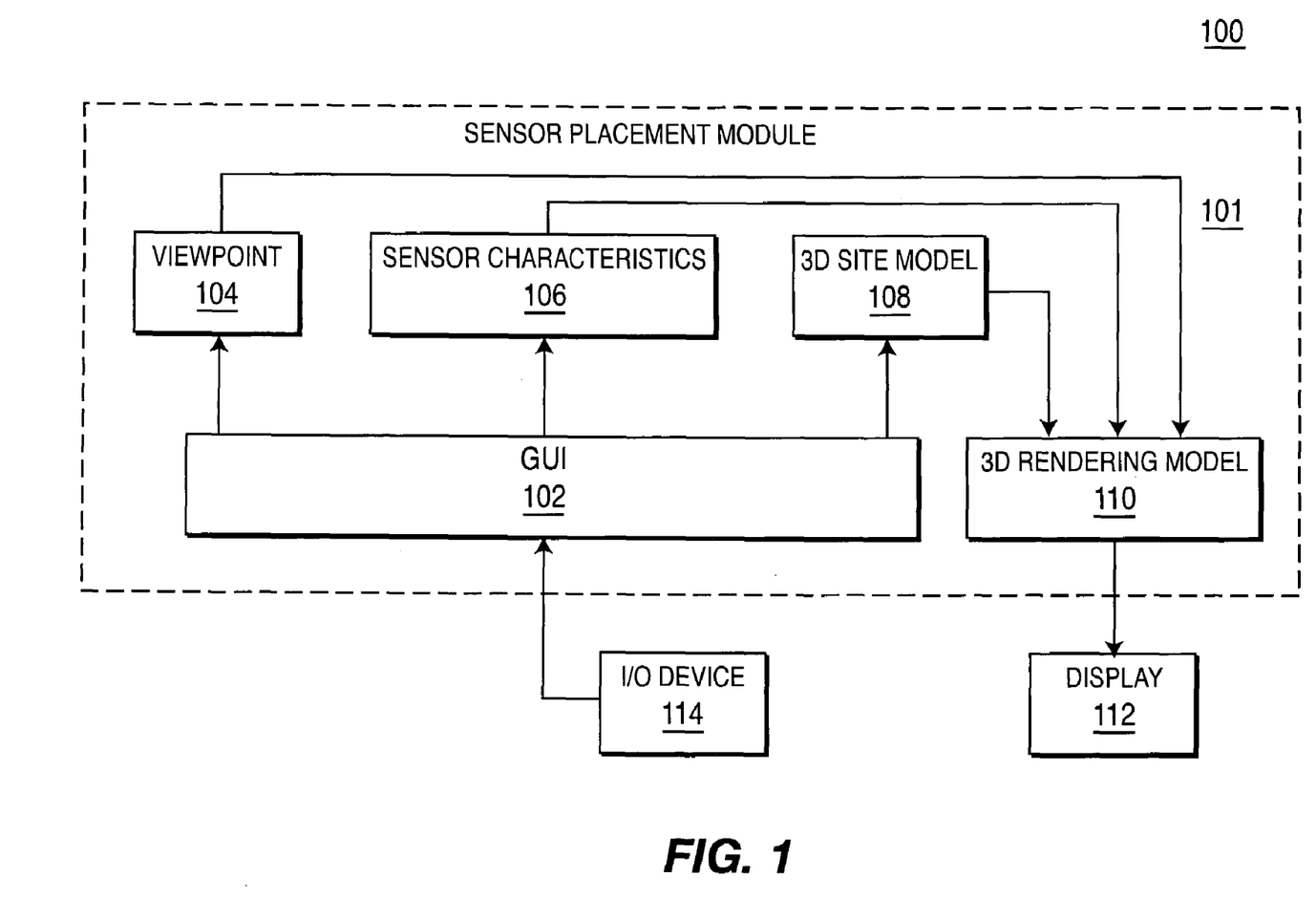
FIG. 1 depicts a high level block diagram of a system in accordance with the invention.

FIG. 1 depicts a high level block diagram of a sensor placement system 100 in accordance with an embodiment of the invention. The system comprises a sensor placement module 101, one or more I/O devices 114, and a display 112. The system utilizes one or more I/O devices 114 for the input of information and/or adjustment of parameters by a user. The I/O devices 114 can be a keyboard, mouse, joystick, trackball or the like.

An interactive graphical user interface ("GUI") 102 receives instructions from the I/O devices 114 and selects and loads one or more pre-stored 3D models 108. In addition, the GUI 102 is also used to place sensors and to select their configuration or sensor parameters 106 such as field of view and resolution. The GUI can be used to adjust the sensor(s) and to select a viewpoint 104 from which the 3D site model 108 and the sensor coverage area are observed. The viewpoint 104, sensor parameters 106, and 3D model are rendered using a rendering module or engine 110 discussed in further detail below. As the user moves the sensor and/or adjusts the sensor parameters 106 (e.g., the position of the sensor), the user is able to dynamically observe the changes on the visual display 112. As the user adjusts the sensor parameters 106, the user is able to immediately assess the effectiveness of the placement of the sensors.

The rendering module receives the 3D site model and the sensors(s) to illustrate a scene that may show a) the correct view of the 3D scene from an arbitrary viewpoint, accounting for occluding surfaces, and b) the correct field of coverage of the sensor, given sensor parameters, while also accounting for occluding surfaces in the 3D scene. As a result, various viewing angles of the scene can be selected. The viewing angles can be selected from the perspective of a virtual sensor or from an arbitrary view point in the scene. Thus, the system 100 easily displays the effect of occlusions and, thereby allows interactive adjustments of the sensor parameters 106 and/or the addition of more sensors to minimize the effects of occlusions. As a result, the user can rapidly position cameras or other sensors in a very complex scene to assess the effectiveness and/or the coverage of the sensor placement.

The GUI 102 can be used to insert objects into a scene and to allow viewing of the scene and the camera from a different view, (i.e., from a third party perspective). The view of the scene can be selected by the user or set by default.

In the manual insertion process, the user inserts sensors into a scene and adjusts the sensor parameters of the camera in accordance with criteria desired by the user. For example, the user may position the camera to minimize occluded area or to maximize the coverage area of camera. Specifically, the user can drag-and-drop the sensor (e.g., a camera) on the 3D model and adjust it interactively in order to optimize the design of a sensor or camera layout at a scene.

In addition, the sensor placement module 101 can automatically position sensors within a 3D model and render the composite image accordingly. For example, a video can be created of a site for offline testing of algorithms with choreographed moving or static objects captured from moving or static cameras. The user specifies areas to be covered and areas of installation in the site by using the GUI to select these areas. The user also uses the GUI to answer a set of predetermined questions to identify the hardware and software configuration for the specific need(s). For example, in a typical session, the user selects the number of cameras to be used and the types of automatic detection algorithms to be applied (e.g., left-object detection, motion detection, perimeter breach alarm, and tracking). The sensor placement module 101 suggests items, including but not limited to, where the cameras are mounted in the regions specified and the orientation of each camera. The sensor placement module 101 can maximize the coverage of the critical areas and satisfy the criteria of detection algorithms. The sensor placement module 101 uses a global optimization routine to mutually adjust parameters in the system. If the sensor placement module 101 can not converge to a solution, the sensor placement module 101 suggests changing some of the parameters (e.g., increasing the camera number, etc).

The 3D site model 108 may be acquired from various sources and by various means. For example, 3D models in different 3D model formats can be used in accordance with the invention (e.g., the VRML and OBJ formats). Commonly owned and assigned U.S. application Ser. No. 10/191, 397 filed Jul. 8, 2002 discloses an exemplary method for acquiring 3D models and is incorporated by reference herein.

However, for some applications, a 3D model of the site may not be directly available or necessary. In addition, creation of the 3D model of a site may be time consuming and expensive to generate. In these cases, the sensor placement design system 100 utilizes a library of standard 3D models, such as walls, hangars, fences, that the user can load into the system 100 and placed with respect to each other to create a full 3D model. These model modules can be pieced together to model the entire 3D scene, or just 1 or 2 of the modules can be loaded into the system 100 to model particular locations of the scene. For example, if a sensor system is designed to protect the outer perimeter of a building, then there is no need to load up models of the building, but instead, the system 100 may only need a model of the perimeter. Also, if the scene is particularly simple, such as a straight fence segment, then a model of a fence can be loaded and used to design the sensor placement.

Figure 2:
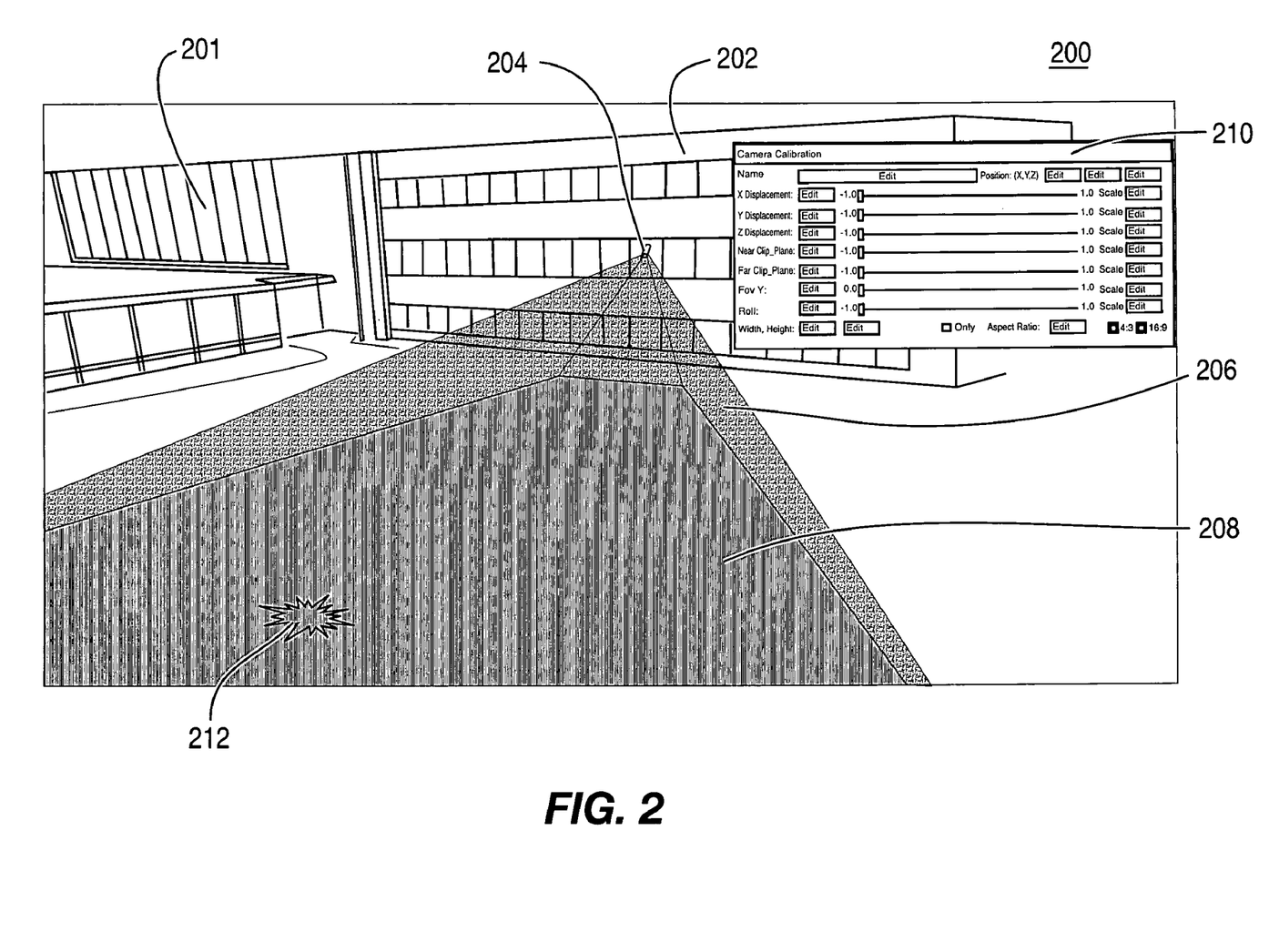
FIG. 2 depicts a viewpoint of a 3D model of a scene having a sensor in accordance with an embodiment of the invention.

FIG. 2 depicts a viewpoint 200 of a building 201 rendered in a 3D model, in accordance with one embodiment of the invention. The building 201 has a wall 202 having a sensor 204 thereon. For illustrative purposes only, the sensor 204 is depicted as a camera. However it is appreciated that the sensor may be any sensory device (e.g., a motion detector).

FIG. 2 also depicts a viewpoint (i.e., a third party perspective) of the camera 204; the area covered 206 by the camera 204; and a projected test pattern 208. The projected test pattern 208 is depicted by a checkered area which corresponds to regions observed or covered by the camera. The projected test pattern 208 is an indicator to quantify the extent of coverage (e.g., the sensitivity or resolution) for a given sensor arrangement, e.g., the smaller the checkered pattern, the greater the resolution. As the user repositions the camera 204, the area or volume of space covered 206 and the projected test pattern 208 change dynamically. This allows the user to have a sense of the total coverage area by navigating to an appropriate viewpoint within FIG. 2. For example, if a user requires a certain minimum resolution (i.e., the number of pixels which cover a given area) the user can reposition the angle of the camera 204 with respect to the earth. As a result, the size of the checkered pattern changes dynamically in accordance with the movement of the camera.

FIG. 2 also depicts an optional compass 212 and legend 210. The compass 212 provides a rough estimate of the orientation of the scene and of the 3D site model. The legend 210 provides a plurality of sensor parameters such as for example x, y, and z position coordinates of the camera and camera constraints (e.g., camera model limitations). As the camera 204 is moved the information (e.g., coordinates of the camera 204) in the legend 210 changes accordingly. The GUI 102 allows the user to enter a command/select an option to make legend 210 viewable. The parameters listed in the legend are sensor specific, For example, when the sensor is a camera, the legend can include such items as the Cartesian coordinates (x,y,z) of the camera, orientation(pitch, yaw and roll angles) of the camera, focal length, image size,. etc.

When the sensor is an audio sensor, the legend can include such items as the position, orientation, and signal to noise ratio ("S/N") of the audio sensor. The S/N can be dependent upon surrounding material characteristics that have been simulated by the 3D model.

In addition, the system 100 can use a variety of different sensors 204 in a rendered 3D image for viewing on display 112. Further, the user can adjust the sensor parameters 106 for each individual sensor 204.

For clarity, FIG. 2 only depicts one sensor 204 and no occlusions. However, there are instances when more than one sensor 204 is needed and occlusions are present. A detailed explanation of how the invention handles occlusions is provided in greater detail below.

Figure 3:
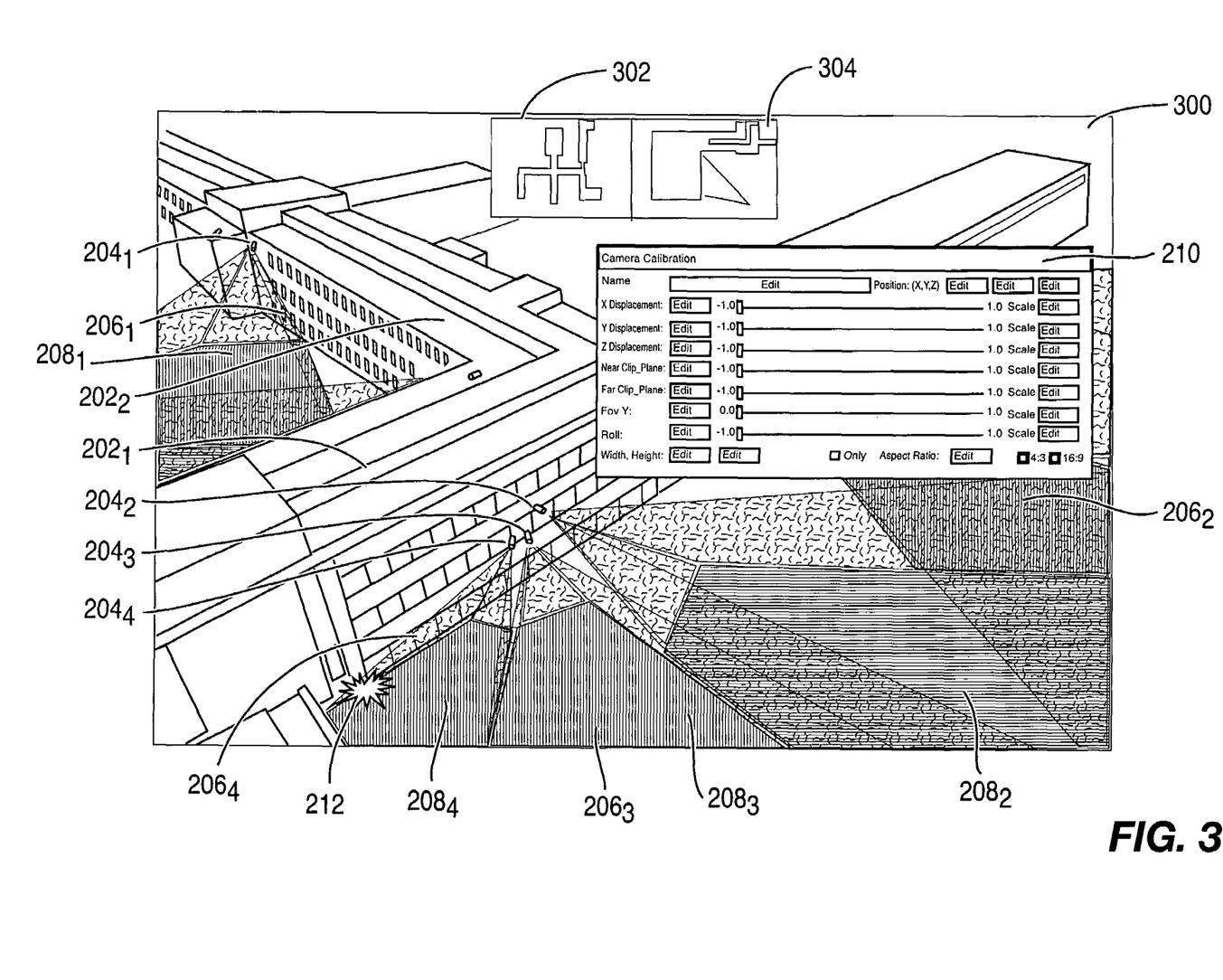
FIG. 3 depicts a viewpoint of 3D model of a scene having multiple sensors in accordance with an embodiment of the invention.

FIG. 3 depicts a viewpoint of a 3D image 300 having multiple sensors in accordance with an embodiment of the invention. The building 201 has multiple walls $202_1$ and $202_2$ (although the building 201 contains more than two walls, for clarity the building 201 is only described with respect to walls $202_1$ and $202_2$). Wall $202_1$ has sensors $204_2$, $204_3$, and $204_4$ thereon; and wall $202_2$ has sensor $204_1$ thereon (collectively sensors 204). Each of the sensors 204 in FIG. 3 is depicted as a camera. However, it is appreciated that the sensors 204 need not be of the same type nor is it necessary for the sensors 204 to have the same sensor parameters 106.

As described in FIG. 2, each of the cameras 204 has associated therewith a respective coverage area 206. For example, cameras $204_1$, $204_2$, $204_3$, and $204_4$ have a respective cover area $206_1$, $206_2$, $206_3$, and $206_4$. Illustratively, the coverage area of each of the cameras 204 is depicted with the test pattern 208. However, the GUI 102 can be used to optionally deselect viewing of respective test patterns 208 associated with any (or all) of the cameras 204 and the respective coverage areas 206. FIG. 3 also depicts the optional compass 212 and legend 210.

In addition, FIG. 3 contains frames 302 and 304. Each of the frames 302 and 304 depicts a "birds eye view" of the building 201 and the coverage provided by sensors 204. Frame 302 depicts a "bird's eye view" having a different zoom ratio than the zoom ratio of the "bird's eye view" depicted in frame 304. These "bird's eye views" allow a user to quickly assess the overall coverage given a particular placement of the sensors 204. However, these views only provide coverage information from one perspective. As discussed below other perspectives will further assist the user to ensure that the overall coverage will satisfy the requirements of a particular sensor deployment. The GUI 102 may be used to select or to de-select an option which allows viewing or hiding either or both of the frames 302 and 304.

After satisfactory placement of any or all of the cameras 204, a report can be generated. Illustratively, the report can contain such items as a view of where the cameras are placed on the wall 204 and the orientation of the cameras; lists all the chosen camera parameters; and images that show the coverage and occluded (i.e., blind spots) areas of the cameras.

Figure 4:
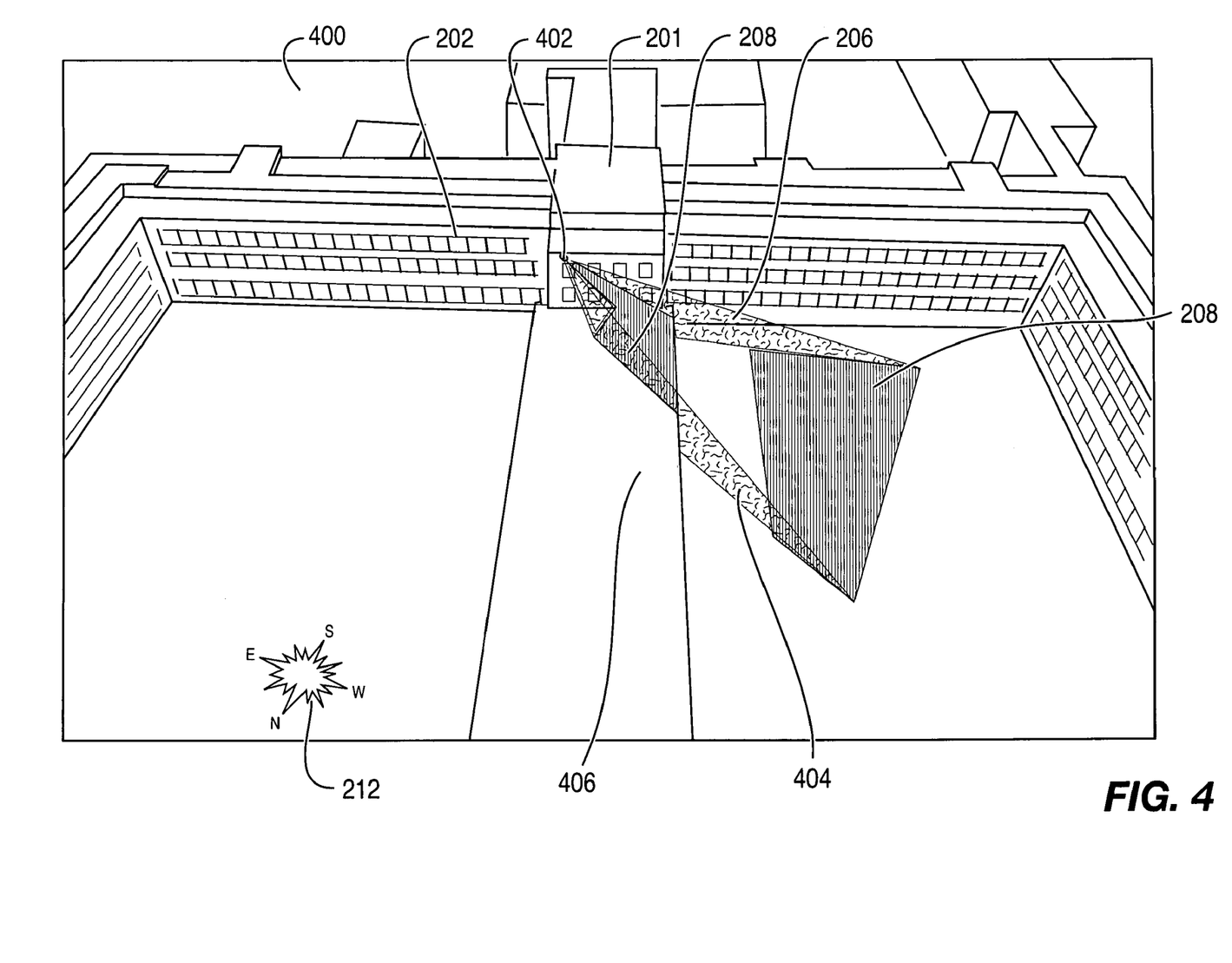
FIG. 4 depicts viewpoint of a 3D model of a scene in accordance with an aspect of the invention.

Often an occlusion is present which blocks all or part of the coverage area 206 of a sensor 204. FIG. 4 depicts a viewpoint of a 3D model 400 having a sensor 402, illustratively a camera, with an occluded area. FIG. 4 illustrates a building 201, a connecting corridor 406, compass 212, and a camera 402. The camera 402 is mounted to one of the multiple walls which form the building 201. Although the building 201 has multiple walls, the invention is described with respect to only the wall 202 which has the camera 402 mounted to it.

The camera 402 has a coverage area 206, an occluded area 404, and a projected test pattern 208 within the coverage area 206. As indicated above, the projected test pattern 208 is depicted as a checkered area that acts as an indicator to quantify the extent of coverage for a given sensor arrangement. Note that the occlude region 404 is present within the covered area 206 but is not part of the projected test pattern 208. The rendering module 110 is able to determine that an occlusion area 404 is present within the coverage area 206 of the camera 402. A method for computing the occluded area 404 is discussed in greater detail below.

In one embodiment, the user can interactively adjust the parameters of the camera 402 using the I/O devices 114. As a result, the effect of the adjustments can be observed immediately. For example, a user may wish to minimize the occluded area 404. The user can reposition the camera on the wall 202 and/or adjust an angle of the camera with respect to the wall 202. The user adjustments are communicated to the rendering module 110. Once the desired result is achieved, additional sensors (e.g., cameras or ultrasonic sensors) can be placed into the 3D model. The projected test patterns 208 for multiple cameras can be simultaneously shown to help ensure that the cameras 402 are optimally placed.

Figure 5:
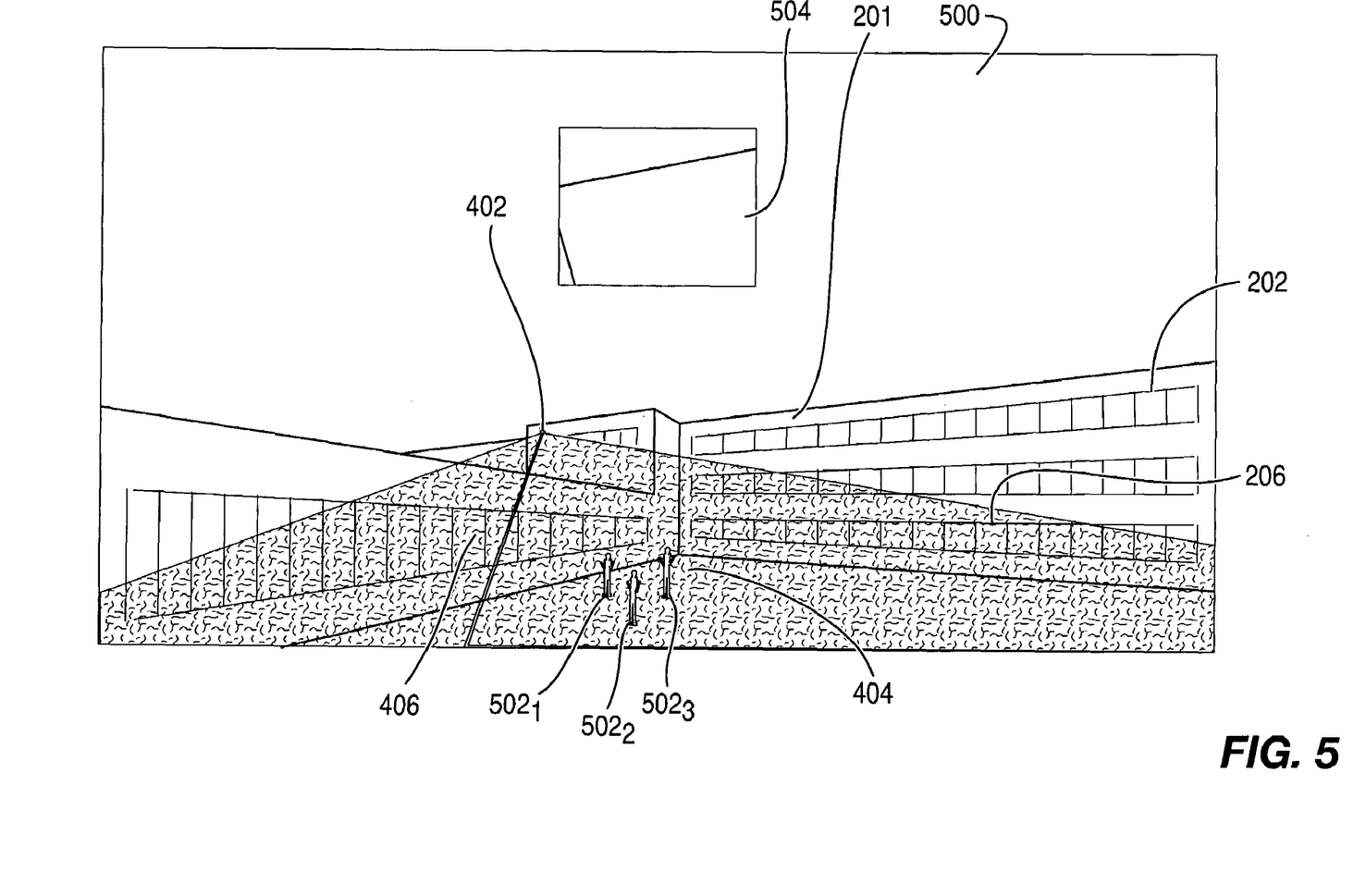
FIG. 5 depicts another viewpoint of the 3D model of the scene of FIG. 4.

FIG. 5 depicts a different viewpoint 500 of the 3D model of FIG. 4. As such, the same sensor parameters 106 are present for the camera in the 3D model of FIGS. 4 and 5. In addition to the elements discussed with respect to FIG. 4, FIG. 5 further comprises a camera perception 504 and objects within the occluded area 404. Illustratively, the objects are people $502_1$, $502_2$, and $502_3$ (collectively people 502). The camera perspective 504 allows a user to view what the camera 402 sees within the coverage area 206 using the current sensor parameters 106. The camera perspective 504 demonstrates that while located within occluded area 404 the people 502 are not viewable from the current position of the camera 402. This viewing capability will quickly allow a user to detect gaps in the coverage of the sensors. Further, the camera perspective 504 is an optional feature which may be selected by the user via the GUI 102.

To determine when an occlusion is present, the system 100 uses a rendering algorithm. Examples of rendering methods that can be used with the present invention are disclosed in commonly assigned U.S. patent application Ser. No. 10/202,546, filed Jul. 24, 2002 and Ser. No. 09/800,550, filed Mar. 7, 2001. The material contained in the '546 and '550 applications is incorporated by reference herein. It is appreciated that various rendering algorithms can be used in accordance with the invention and that the algorithms disclosed herein are for exemplary purposes and not intended in any way to limit the scope of the invention.

For illustrative purposes, the rendering algorithm disclosed in the U.S. patent application Ser. No. 10/202,546 is briefly described herein and is referred to as the "VIDEO FLASHLIGHTS" algorithm. The VIDEO FLASHLIGHT algorithm generates an image at each time instant from a virtual camera viewpoint specified by the user through the GUI 102. Using, VIDEO FLASHLIGHT, an image consists of pixels that show either a test pattern video or an actual video in regions that are illuminated by any of the real cameras, and pixels that contain background model textures for regions that are not illuminated by any camera. The background model textures are static and are represented as standard 3D graphics model representations along with the 3D vertices of the model triangles and their texture coordinates. The textures from the live/test video frames change at the video frame rate. The composite image created for any virtual viewpoint combines the two in the rendering implementation.

When rendering using VIDEO FLASHLIGHT, the light source used in the shadow map algorithm is replaced by a real video flash light camera. The video texture for every frame is considered the "illuminant". The invention implements shadow mapping by taking advantage of projective texturing, depth buffering, automatic texture generation, texture compositing and alpha testing. On platforms that support multi-texturing, this method generally takes one rendering pass for shadow map generation.

Figure 6:
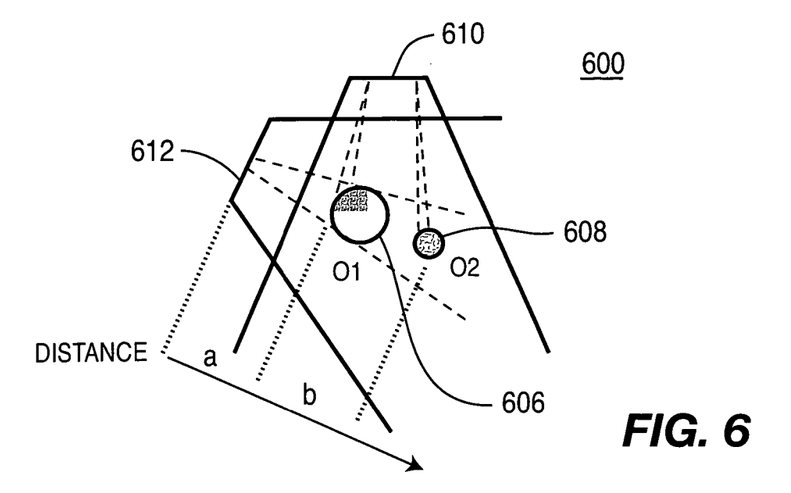
FIG. 6 depicts an illustrative scene demonstrating a relationship between an occluded object and an un-occluded object in accordance with an embodiment of the invention.

FIG. 6 depicts an illustrative scene 600 demonstrating a relationship between objects O1 606 and O2 608. FIG. 6 comprises objects O1 606 and O2 608, a viewpoint of a real flashlight camera 612 (i.e., the VIDEO FLASHLIGHT camera), and a viewpoint of a user-specified virtual camera 610. This relationship is useful in explaining how the senor placement module 101 detects occlusions. For example, the virtual camera 610 sees both objects O1 606 and O2 608. However, the flashlight camera 612 sees object O1 606 only. Thus O2 608 is occluded by O1 606 from the viewpoint of the flashlight camera 612. As a result, only O1 606 is illuminated by textures from the flashlight camera 612. O2 608 comprises static model textures which represent the 3D model site. Thus, when rendering the virtual camera view 610, only the pixels seen by the flashlight camera 612 and the virtual camera 610 are projected with the dynamic video textures.

Specifically, the invention associates two depth values for each point in the scene. The first depth value corresponds to a z-buffer depth for the flashlight camera 612. Each scene that points along a view ray from the flashlight camera is assigned a depth value corresponding to that ray's z-buffer value (e.g., a projective texture). The second depth value is the true depth value for each scene point with respect to the flashlight camera 612. By comparing these two values for every point in the view of the virtual camera 610, it can be established whether the point is seen by the flashlight camera 612 or is occluded. Points with identical depth values are seen by the flashlight camera 612 and should be rendered with the flashlight video texture.

The occlusion handling technique can be implemented as a multi-pass rendering algorithm. The scene 600 is first rendered in the flashlight camera coordinate system to obtain the z-buffer. The z-buffer is stored in the alpha channel of the texture used for flashlight video projection. This is the first alpha value and for each scene point represents the depth of the first hit for a view ray from that point to the flashlight camera center. A second rendering uses automatic texture coordinate generation to set the texture coordinate for each vertex to the true depth value for the vertex with respect to the flashlight camera 612. A 1D ramp-texture is used to define a mapping of this depth to alpha values. This is the second alpha value and represents the true depth for each scene vertex in the flashlight camera coordinates. As a result, for all points visible from the virtual camera 610, there are two alpha values that are compared to determine which points are illuminated by the flashlight camera.

Pixels that satisfy the equality test for the alpha values are illuminated by the flashlight camera 612 and are rendered with the flashlight camera texture while the rest are rendered with the model texture.

For illustrative purposes, an example of pseudo-code for a rendering algorithm is provided:

```
Display {
   for all visible flashlight cameras {
      if (play)
         UpdateVideoContent(Video Source, Frame Number);
      if (moving)
         UpdateDepthMap( );
      else
         UpdateDepthMapOnce( );
   }
   Setup Viewport(ScreenResolution);
   ClearScreenColorBuffer( );
   ClearScreenDepthBuffer( );
   MultMatrix(Inverse(Virtual Camera Pose));
   RenderScene(Geometry+Textures);
   for all visible flashlight cameras
      ExtractVisiblePixels( );
}
UpdateDepthMap {
   SetupViewport(DepthMapResolution);
   ClearDepthBuffer( );
   MultMatrix(Inverse(Camera Pose));
   // Decrease precision error by offseting the geometry
   SetPolygonOffset;
   MaskColors; // Only need z-buffer
   RenderScene(Geometry);
   ReadDepthBuffer( );
   TransferDepthToAlphaChannel(VideoTextureRGBA);
}
ExtractVisiblePixels {
   SetupTexture1( );
   BindTexture(RampTexture);
   // ZToTextureCoordinate Matrix extracts
   // Z-component
   SetupEyeLinearTextureCoordinateGeneration(
   ZToTextureCoordinateMatrix*Inverse(Camera Pose));
   SetupTextureEnvironment(UseTextureAlpha);
   SetupTexture2( );
   BindTexture(VideoTextureRGBA);
   SetupEyeLinearTextureCoordinateGeneration(
   Inverse(Camera Pose));
   SetupTextureEnvironment(
   SubtractPreviousTextureAlpha, UseTextureRGB);
   EnableAlphaTesting( );
   SetAlphaFunc( );
   // Avoid back projection
   SetupCullingPlane(CameraImagePlane);
   RenderScene(Geometry);
}
```

In the algorithm, video content and depth maps are updated on an as-needed basis. Depth map textures are obtained by rendering the geometry in either the framebuffer or in the p-buffer. During this process, polygon offsetting is utilized in order to avoid re-sampling and precision errors. Once all the textures are updated, a scene is rendered with the static model (background) textures. Then for visible flashlight cameras, two textures are projected using the corresponding camera pose matrices.

The first texture uses an extra matrix operation ("ZToTextureCoordinateMatrix") to map the Z values of all the scene points in the frustum of a flashlight camera in the camera coordinates to the s coordinate in the texture coordinates. Because the occlusion calculation is performed in the texture domain, the Z values are mapped to texture values using a 1D ramp texture. The Z-values corresponding to the scene points behind the camera are culled by specifying the camera image plane as the culling plane.

The second texture has the z-buffer depth map in the alpha channel and the video content in the RGB channel. The texture environment is set such that the alpha values are subtracted from the previous texture's alpha, which implements the occlusion test depicted in FIG. 6.

Shadow map extensions can be used with the invention. For example, the z-buffer described above is transferred to a shadow map texture. The output values, usually 0 or 1, generated by this texture, flag the pixels as shadowed or illuminated respectively. These flags-can be used for rendering the final pixels. When the automatic texture generation in the flashlight camera coordinates is turned on, for a computed texture coordinate, {s,t,r,q}, {s/q, t/q} points to the z-buffer value, and r/q represents the true depth. Implicit comparison of the z-buffer value with the true depth enables occlusion handling in the shadow map extensions.

Figure 7:
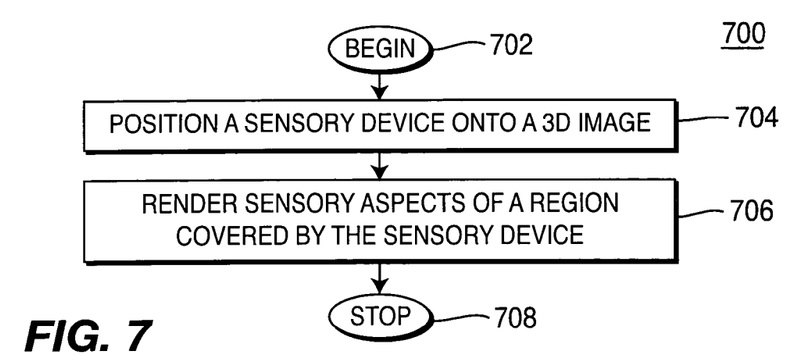
FIG. 7 depicts a flow chart of a method in accordance with an embodiment of the invention.

FIG. 7 depicts a flowchart of a method 700 in accordance with the invention. The method 700, begins at step 702 and proceeds to step 704. At step 704, an interface (e.g., a GUI) is used to select a sensor. Further, the GUI 102 is used to position the sensor 204 (e.g., a camera) onto a selected 3D site model. In one embodiment, the 3D site model is a model of an actual site where the sensor(s) are subsequently installed. In another embodiment, a user can use the GUI 102 to select a generic model suitable for use in determining where sensor(s) are to be placed at a location (e.g., a model of a fence or wall).

At step 706, sensory parameters 106 associated with a sensor, the 3D site model, and a viewpoint 104 are rendered using the 3D rendering algorithm. Specifically, the 3D rendering module 110 uses a rendering algorithm to compare, on a pixel by pixel basis, the pixels observable from the viewpoint of the camera and the pixels observable from a user selected virtual camera. When the pixels are different, the method 700 determines that an occlusion is present. When a user adjusts the sensory parameters using the sensory characteristic module 106 the rendered 3D image changes accordingly. The method 700 proceeds to and ends at step 708.

In yet. another embodiment, the user uses the GUI 102 to enter the number of sensors and/or sensor characteristic 106 for the selected 3D site mode. The rendering module 110 can automatically position the senor(s) in accordance with constraints determined by the user. For example, if the user selects a number of sensors for placement in a 3D site model, the rendering module 110 can place the sensors to maximize the coverage area (e.g., by minimizing the occluded areas).

Figure 8:
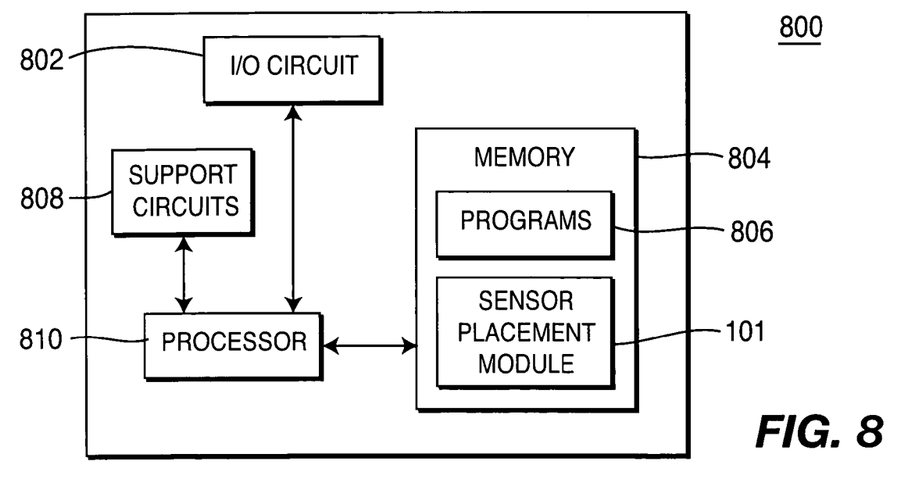
FIG. 8 depicts a high level block diagram of a computer architecture for performing an embodiment of the invention.

FIG. 8 depicts a general purpose computer 800 suitable for use in performing the method of FIG. 7. The general purpose computer of FIG. 8 comprises a processor 810 as well as a memory 804 for storing control programs and the like. The processor 810 cooperates with conventional support circuitry 808 such as power supplies, clock circuits, cache memory and the like as well as circuits that assist in executing the software routines 806 stored in the memory 804. As such, it is contemplated that some of the process steps discussed herein as software processes may be loaded from a storage device (e.g., an optical drive, floppy drive, disk drive, etc.) and implemented within the memory 804 and operated by the processor 810. Thus, various steps and methods of the present invention can be stored on a computer readable medium. The general purpose computer 800 also contains input-output circuitry 802 that forms an interface between the various functional elements communicating with the general purpose computer 800. For example, in the embodiment of FIG. 8, the general purpose computer 800 communicates with I/O devices 114. The processor 810 interprets inputs received from the I/O devices 114 and, in response thereto, the processor 810 forwards the inputs to the sensor placement module 101. The sensor placement module 101 uses the instructions (e.g., the relating to the viewpoint 104 (either default or selected), the sensor parameters 106, and the 3D site model 108) to render a 3D image.

Although FIG. 8 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

In one embodiment of the invention, the viewpoint 104 of a 3D site model and/or the sensory parameters 106 for a sensor is set by default. In other embodiments, the user uses the GUI 102 to select a viewpoint 104 and/or the sensory parameters 106 of the sensor.

Furthermore, the invention disclosed herein can use shadow mapping, clipping planes, or special texture culling operations depending on, for example, the hardware used and the level of performance desired. Shadow mapping utilizes texturing, depth buffering, and arithmetic/logical operations at the texture and fragment levels. For example, hardware can be used for shadow mapping which employs projective textures, texture compositing and fragment testing without the need to rely on any restrictive hardware extension. In other embodiments, dedicated extensions such as SGI extensions can be used.

While the foregoing is directed to embodiments of the present invention, other and further embodiments of the invention may be devised without departing from the basic scope thereof, and the scope thereof is determined by the claims that follow.

The invention claimed is:

1. A method for dynamic sensor placement comprising:
   positioning at least one sensory device in a scene of a 3D site model supported in a computer;
   said 3D site model including data defining a plurality of surfaces in three dimensions making up a plurality of objects in the site model;
   rendering in said computer an image of at least part of said scene of the 3D site model in which at least part of a coverage of said at least one sensory device within the scene of said 3D site model is displayed, and part of the scene of the 3D site model outside said coverage is displayed, said coverage being derived in accordance with sensor parameters associated with said at least one sensory device; and
   said rendering of said image being derived for a view point in said 3D site model that is different from the positioning of said sensory device; and
   wherein said rendering step renders the coverage of said sensor in accordance with said sensor parameters such that surfaces in the 3D site model in said image have a texture that differentiates the coverage from the part of the scene that is not in said coverage;
   said surfaces in said image being disposed in the site model at a plurality of different respective three dimensional orientations; and
   wherein, when one of the surfaces or objects of the 3D site model is positioned so as to be an occlusion between an occluded area that absent the occlusion is in the coverage covered by said at least one sensory device, said image is rendered so that the occluded area has a texture that differentiates from surfaces in the coverage of the sensory device.

2. The method of claim 1, further comprising:
   receiving input from a device representing an adjustment to at least one of the 3D site model, sensory parameters, and view point for viewing said at least one sensory device, and rendering a subsequent image derived for said view point and of at least part of said coverage of said sensory device based on said adjustment or on values changed thereby.

3. The method of claim 1, wherein said at least one sensory device is associated with sensor parameters that define relative to said 3D site model characteristics modeling a sensor selected from the group consisting of a camera, a motion sensor, an ultrasonic sensor, and an infrared sensor.

4. The method of claim 1, wherein said positioning occurs automatically in accordance with at least one of a minimization of an occluded area, a maximization of the coverage, and said sensory parameters.

5. A method for dynamic sensor placement comprising:
selecting a 3D site model supported in a computer, said 3D site model including data defining a plurality of surfaces in a scene;
selecting a sensor for placement into said 3D site model; and
rendering said sensor within the scene of said 3D site model in accordance with sensor parameters associated with said sensor;
said rendering being performed by said computer for a point of view other than the location of the sensor, and including preparing an image of the scene from said point of view that includes at least part of a coverage area for said sensor, said coverage area being made up of the surfaces or parts of the surfaces that are covered by the sensor as derived in accordance with the 3D site model and the sensor parameters, and also includes a portion of the 3D site model that is not in said coverage area; and
wherein said rendering step renders the coverage area covered by said sensor in accordance with said sensor parameters such that the surfaces in the scene of the 3D model that constitute the coverage area have a texture that differentiates said surfaces from the surfaces in the scene that are not in said coverage area;
said surfaces that constitute the coverage area being oriented in a plurality of three-dimensional orientations in the 3D site model; and
wherein, when one of the surfaces of the 3D site model is positioned so as to be an occlusion between an occluded area that absent the occlusion would be covered by said sensor, said image is rendered so that the occluded area has a texture that differentiates from the coverage area.

6. The method of claim 5, and further comprising:
selecting a viewpoint for viewing said scene and using said viewpoint as the point of view in rendering said scene.

7. The method of claim 5, and further comprising:
providing a graphical user interface for each of said selecting steps.

8. The method of claim 5, wherein said rendering step further comprises:
positioning automatically said sensor in accordance with at least one of one of a minimization of an occluded area, a maximization of the coverage area, and a sensor parameter.

9. A computer-readable medium having stored thereon a plurality of instructions, the plurality of instructions including instructions which, when executed by a processor, cause the processor to perform the steps comprising:
positioning at least one sensor in a scene of a 3D model, said 3D model including data defining a plurality of surfaces forming objects in the 3D model, said surfaces being each oriented in different three-dimensional orientations and or locations in the scene; and
rendering dynamically images of said sensor in the scene of said 3D site model in accordance with sensor parameters associated with said sensor, wherein said rendering renders an image including a view at least one of the surfaces that has an area covered by said sensor in accordance with said sensor parameters;
wherein the images are from one or more viewpoints, none of which are that of the sensor; and
wherein in said rendering the area covered by said sensor in accordance with said sensor parameters is rendered such that surfaces in the images of the scene of the 3D model that are covered by the sensor have a texture that differentiates said surfaces from surfaces in the rendered images that are not covered by the sensor;
said surfaces in said image being oriented at a plurality of different respective three dimensional orientations; and
wherein, when one of the surfaces of the 3D site model is positioned so as to be an occlusion between an occluded area that absent the occlusion would be covered by said sensor, said image is rendered so that the occluded area has a texture that differentiates from the area covered by said sensor.

10. The computer-readable medium according to claim 9, and further comprising:
selecting a viewpoint for viewing said scene and using said viewpoint in rendering one of said images.

11. The computer-readable medium according to claim 9, wherein said positioning step automatically positions said at least one sensor in the scene of the 3D model in accordance with at least one of a minimization of an occluded area and a maximization of a coverage area.

12. Apparatus for dynamic sensor placement, said apparatus comprising:
means for positioning at least one sensor in a scene of a 3D model; and
means for rendering dynamically images of said sensor within the scene of said 3D site model in accordance with sensor parameters associated with said at least one sensory device and for displaying said images to a user;
wherein the images are from one or more viewpoints none of which are that of the sensor; and
wherein in said rendering the area covered by said sensor in accordance with said sensor parameters is rendered such that surfaces in the image of the scene of the 3D model that are covered by the sensor have a texture that differentiates said surfaces from surfaces in the rendered images that are not covered by the sensor;
said surfaces in said image being oriented at a plurality of different respective three dimensional orientations; and
wherein, when one of the surfaces of the 3D site model is positioned so as to be an occlusion between an occluded area that absent the occlusion would be covered by said sensor, said image is rendered so that the occluded area has a texture that differentiates from the coverage area.

13. The apparatus of claim 12, further comprising:
means for changing at least one of said sensory parameters or one of said viewpoints.

14. A method for placing a plurality of surveillance cameras in a site, said method comprising:
providing on a computer scene data of a 3D model of the site;
providing to said computer position data defining discrete positions for each of a plurality of cameras in said 3D model, each camera being associated with data defining viewing parameters defining coverage thereof;

rendering with said computer an image of the site from a viewpoint based on said 3D model, said image showing at least a part of the coverage of at least one of the cameras in said 3D model determined from the position data for said camera and the viewing parameters thereof, wherein the coverage is marked in the image with a texture applied to surfaces in the 3D model in said coverage, said surfaces being disposed in the 3D site in a plurality of different three-dimensional orientations; and displaying said image so as to be viewed by a user;

wherein in said rendering the texture applied to surfaces in the 3D model in each of said coverages is a pattern that indicates resolution of the view thereof by the associated camera.

15. The method of claim 14, and further comprising receiving input to said computer and based thereon changing the position data parameters for at least one of said cameras to adjusted position data reflecting an adjusted position of said camera in the 3D site model; and rendering a second image of the site from the viewpoint that is based on said 3D model and that shows at least a part of a coverage area in said 3D model determined using the adjusted position data for said camera and the viewing parameters thereof; and displaying said second image.

16. The method of claim 14, and further comprising receiving input to said computer indicative of an adjustment in the viewpoint to a second viewpoint; and rendering a second image of the site from the second viewpoint based on said 3D model and showing at least a part of the coverage area.

17. The method of claim 14 wherein the computer is further provided with sensor position data defining a position of a sensor in said 3D model, and sensor parameters indicative of the coverage thereof; said image being rendered to show at least part of a sensor coverage area defined by said sensor position and said sensor parameters.

18. A method for placing a plurality of surveillance cameras in a site, said method comprising:

providing on a computer scene data of a 3D model of the site;

providing to said computer position data defining discrete positions for each of a plurality of cameras in said 3D model, each camera being associated with data defining viewing parameters defining a coverage area thereof;

rendering with said computer an image of the site from a viewpoint based on said 3D model, said image showing at least a part of the coverage area of at least one of the cameras in said 3D model determined from the position data for said camera and the viewing parameters thereof, wherein the coverage area is marked in the image with a texture applied to surfaces in the 3D model in said coverage, said surfaces being disposed in the 3D site in a plurality of different three-dimensional orientations; and displaying said image so as to be viewed by a user; and wherein the rendering of said image includes ray tracing between the viewpoint and a point on a surface in the 3D model and ray tracing between the point on the surface in the 3D model and each of the cameras, said point being displayed as in the coverage area when said ray tracings do not encounter any occlusion in the 3D model between said point on said surface and at least one of the cameras, and being displayed as outside the coverage area when there is an occlusion between the point and all of said cameras.

19. The method of claim 18 wherein the texture is a different shade or coloration of the coverage area relative to other surfaces in said image.

20. A method for dynamic sensor placement comprising:

positioning at least one sensory device in a scene of a 3D site model supported in a computer;

said 3D site model including data defining a plurality of surfaces in three dimensions making up a plurality of objects in the site model;

rendering in said computer an image of at least part of said scene of the 3D site model in which at least part of a coverage of said at least one sensory device within the scene of said 3D site model is displayed, and part of the scene of the 3D site model outside said coverage is displayed, said coverage being derived in accordance with sensor parameters associated with said at least one sensory device; and said rendering of said image being derived for a view point in said 3D site model that is different from the positioning of said sensory device; and wherein said rendering step renders the coverage of said sensor in accordance with said sensor parameters such that surfaces in the 3D site model in said image have a texture that differentiates the coverage from the part of the scene that is not in said coverage;

said surfaces in said image being disposed in the site model at a plurality of different respective three dimensional orientations; and wherein the texture of the coverage is a pattern indicative of resolution of the coverage of the sensory device of the surfaces.

21. A method for dynamic sensor placement comprising:

selecting a 3D site model supported in a computer, said 3D site model including data defining a plurality of surfaces in a scene;

selecting a sensor for placement into said 3D site model; and rendering said sensor within the scene of said 3D site model in accordance with sensor parameters associated with said sensor;

said rendering being performed by said computer for a point of view other than the location of the sensor, and including preparing an image of the scene from said point of view that includes at least part of a coverage area for said sensor, said coverage area being made up of the surfaces or parts of the surfaces that are covered by the sensor as derived in accordance with the 3D site model and the sensor parameters, and also includes a portion of the 3D site model that is not in said coverage area; and wherein said rendering step renders the coverage area covered by said sensor in accordance with said sensor parameters such that the surfaces in the scene of the 3D model that constitute the coverage area have a texture that differentiates said surfaces from the surfaces in the scene that are not in said coverage area;

said surfaces that constitute the coverage area being oriented in a plurality of three-dimensional orientations in the 3D site model; and wherein the texture of the coverage area is a pattern indicative of resolution of the coverage of the sensor on the respective surface.

22. A computer-readable medium having stored thereon a plurality of instructions, the plurality of instructions including instructions which, when executed by a processor, cause the processor to perform the steps comprising:

positioning at least one sensor in a scene of a 3D model, said 3D model including data defining a plurality of surfaces forming objects in the 3D model, said surfaces being each oriented in different three-dimensional orientations and or locations in the scene; and rendering dynamically images of said sensor in the scene of said 3D site model in accordance with sensor parameters associated with said sensor, wherein said rendering renders an image including a view at least one of the surfaces that has an area covered by said sensor in accordance with said sensor parameters;

wherein the images are from one or more viewpoints, none of which are that of the sensor; and wherein in said rendering the area covered by said sensor in accordance with said sensor parameters is rendered such that surfaces in the images of the scene of the 3D model that are covered by the sensor have a texture that differentiates said surfaces from surfaces in the rendered images that are not covered by the sensor;

said surfaces in said image being oriented at a plurality of different respective three dimensional orientations; and wherein the texture of the area covered by the sensor is a pattern indicative of resolution of the coverage of the sensor on the respective surface.

23. Apparatus for dynamic sensor placement, said apparatus comprising:

means for positioning at least one sensor in a scene of a 3D model; and means for rendering dynamically images of said sensor within the scene of said 3D site model in accordance with sensor parameters associated with said at least one sensory device and for displaying said images to a user;

wherein the images are from one or more viewpoints none of which are that of the sensor; and wherein in said rendering the area covered by said sensor in accordance with said sensor parameters is rendered such that surfaces in the images of the scene of the 3D model that are covered by the sensor have a texture that differentiates said surfaces from surfaces in the rendered images that are not covered by the sensor;

said surfaces in said image being oriented at a plurality of different respective three dimensional orientations; and wherein the texture of the area covered by the sensor is a pattern indicative of resolution of the coverage of the sensor on the respective surface.

24. The method of claim 1, wherein the sensor parameters correspond to viewing parameters of a camera and a position and an orientation thereof, and said position or orientation of the parameter is modified responsive to input received from a user.

25. The method of claim 24 wherein the texture of the surfaces in the coverage has a pattern indicating a resolution of the camera in surveillance of said surfaces in the coverage.

26. The method of claim 5, wherein the sensor parameters correspond to viewing parameters of a camera and a position and an orientation thereof, and said position or orientation of the parameter is modified responsive to input received from a user.

27. The method of claim 26, wherein the texture of the surfaces in the coverage area has a pattern indicating a resolution of the camera in surveillance of said surfaces in the coverage area.

28. The medium of claim 9, wherein the sensor parameters correspond to viewing parameters of a camera and a position and an orientation thereof, and the instructions include instructions causing the processor to modify said position or orientation of the camera responsive to input received from a user.

29. The medium of claim 28, wherein the texture of the surfaces in the coverage area has a pattern indicating a resolution of the camera in surveillance of said surfaces in the area covered by the sensor.

30. The apparatus of claim 12, wherein the sensor parameters correspond to viewing parameters of a camera and a position and an orientation thereof, and said apparatus further comprising means for modifying said position or orientation of the camera responsive to input received from a user.

31. The apparatus of claim 30, wherein the texture of the surfaces in the coverage area has a pattern indicating a resolution of the camera surveillance of said surfaces in the coverage area.

32. The method of claim 15, wherein when one of the surfaces of the 3D model is positioned between the position of one of the cameras and an occluded surface that would otherwise be in the coverage of said camera, said occluded surface is rendered in said image with a texture that distinguishes the occluded surface from said coverage.

33. The method of claim 18, and further comprising modifying the position of one or more of the cameras in the 3D model responsive to an input from a user, and rendering a further image wherein the coverage area of said camera is derived based on said modified position thereof.

34. The method of claim 33, wherein the texture of the surfaces in at least one of the coverage areas has a pattern indicating a resolution of the associated camera surveillance of said surfaces in the coverage area.

35. The method of claim 20, wherein the sensor parameters correspond to viewing parameters of a camera and a position and an orientation thereof, and said position or orientation of the parameter is modified responsive to input received from a user.

36. The method of claim 21, wherein the sensor parameters correspond to viewing parameters of a camera and a position and an orientation thereof, and said position or orientation of the parameter is modified responsive to input received from a user.

37. The medium of claim 22, wherein the sensor parameters correspond to viewing parameters of a camera and a position and an orientation thereof, and the instructions include instructions causing the processor to modify said position or orientation of the camera responsive to input received from a user.

38. The apparatus of claim 23, wherein the sensor parameters correspond to viewing parameters of a camera and a position and an orientation thereof, and said apparatus further comprising means for modifying said position or orientation of the camera responsive to input received from a user.

* * * * *